(12) United States Patent
Cho et al.

(10) Patent No.: US 7,664,087 B2
(45) Date of Patent: Feb. 16, 2010

(54) METHOD FOR GENERATING A FRAME IN AN ORTHOGONAL FREQUENCY DIVISION MULTIPLE ACCESS COMMUNICATION SYSTEM

(75) Inventors: Sung-Hyun Cho, Suwon-si (KR); Cheol-Woo You, Seoul (KR)

(73) Assignee: Samsung Electronics Co., Ltd (KR)

( * ) Notice: Subject to any disclaimer, the term of this patent is extended or adjusted under 35 U.S.C. 154(b) by 472 days.

(21) Appl. No.: 11/522,196

(22) Filed: Sep. 15, 2006

(65) Prior Publication Data

US 2007/0058523 A1    Mar. 15, 2007

(30) Foreign Application Priority Data

Sep. 15, 2005    (KR)    ............... 10-2005-0086524

(51) Int. Cl.
*H04W 4/00*    (2009.01)
*H04J 11/00*    (2006.01)
*H04J 3/00*    (2006.01)
*H04B 7/02*    (2006.01)
*H04L 27/00*    (2006.01)

(52) U.S. Cl. .................... 370/338; 370/208; 370/329; 370/336; 375/267; 375/295

(58) Field of Classification Search ............. 370/338, 370/208
See application file for complete search history.

(56) References Cited

U.S. PATENT DOCUMENTS

| 2004/0101063 | A1* | 5/2004 | Sipila .................. 375/267 |
| 2004/0114566 | A1 | 6/2004 | Lim et al. |
| 2005/0122928 | A1 | 6/2005 | Vijayan et al. |
| 2005/0286408 | A1* | 12/2005 | Jin et al. .................. 370/208 |

FOREIGN PATENT DOCUMENTS

| KR | 1020040098394 | 11/2004 |
| KR | 1020050009663 | 1/2005 |
| KR | 1020050049299 | 5/2005 |
| KR | 1020070046695 | 5/2007 |
| WO | WO 03/005742 | 1/2003 |

* cited by examiner

*Primary Examiner*—Vincent P Harper
*Assistant Examiner*—Timothy Pham
(74) *Attorney, Agent, or Firm*—The Farrell Law Firm, LLP

(57) ABSTRACT

Disclosed is a method for generating a frame in an Orthogonal Frequency Division Multiple Access communication system. The method includes generating a frame having a global information zone and a local information zone, wherein the global information zone includes information that is necessary to be received commonly in all of user terminals; and the local information zone includes user terminal-by-user terminal or service-by-service traffic that is unnecessary to be received commonly in all of the user terminals.

11 Claims, 12 Drawing Sheets

| Syntax | Size |
|---|---|
| DL-MAP_Message_Format(){ | |
|     Management Message Type=2 | 8 bits |
|     PHY Synchronization Field | Variable |
|     DCD Count | 8 bits |
|     Base Station ID | 48 bits |
|     Begin PHY Specific Section { | |
|         For (i=1;i<=n;i++) { | |
|             DL-MAP_IE() | Variable |
|         } | |
|     } | |
|     If !(byte boundary){ | |
|         Padding Nibble | 4 bits |
|     } | |
| } | |

(210 points to the group: Management Message Type, PHY Synchronization Field, DCD Count, Base Station ID)
(220 points to DL-MAP_IE())

FIG.2

| Syntax | Size |
|---|---|
| DL-MAP_IE(){ | |
|   DIUC | 4 bits |
|   if (DIUC=15){ | |
|     Extended DIUC dependent IE | Variable |
|   } else { | |
|     if (INC_CID=1) | |
|     {N_CID | |
|     for (n=0;n<N_CID;n++){ | |
|       CID | 16 bits |
|     } | |
|     OFDMA symbol offset | 8 bits |
|     Subchannel offset | 6 bits |
|     Boosting | 3 bits |
|     No. OFDMA Symbols | 7 bits |
|     No. Subchannels | 6 bits |
|     Repetition Coding Indication | 2 bits |
|   } | |
| } | |

FIG.3

| Syntax | Size |
|---|---|
| UL-MAP_Message_Format(){ | |
|    Management Message Type=3 | 8 bits |
|    Uplink Channel ID | 8 bits |
|    DCD Count | 8 bits |
|    Allocation Start Time | 32 bits |
|    Begin PHY Specific Section { | |
|      For (i=1;i<=n;i++) { | |
|        UL-MAP_IE() | Variable |
|      } | |
|    } | |
|    If !(byte boundary){ | |
|      Padding Nibble | 4 bits |
|    } | |
| } | |

210 — Management Message Type=3, Uplink Channel ID, DCD Count, Allocation Start Time
220 — UL-MAP_IE()

FIG.4

| Syntax | Size |
|---|---|
| UL-MAP_IE(){ | |
|     CID | 16 bits |
|     UIUC | 4 bits |
|     if (UIUC=12){ | |
|         OFDMA Symbol offset | 8 bits |
|         Subchannel offset | 7 bits |
|         No. OFDMA Symbols | 7 bits |
|         No. subchannels | 7 bits |
|         Ranging Method | 2 bits |
|         reserved | 1 bit |
|     } else if (UIUC=14) { | |
|         CDMA_Allocation_IE() | 32 bits |
|     else if (UIUC=15){ | |
|         Extended UIUC dependent IE | Variable |
|     } else { | 7 bits |
|         Duration | 10 bits |
|         Repetition Coding Indication | 2 bits |
|     } | |
|     Padding nibble, if needed | 4 bits |
| } | |

FIG.5

METHOD FOR GENERATING A FRAME IN AN ORTHOGONAL FREQUENCY DIVISION MULTIPLE ACCESS COMMUNICATION SYSTEM

PRIORITY

This application claims priority under 35 U.S.C. § 119 to an application filed in the Korean Intellectual Property Office on Sep. 15, 2005 and assigned Serial No. 2005-86524, the contents of which are incorporated herein by reference.

BACKGROUND OF THE INVENTION

1. Field of the Invention

The present invention relates generally to a method for generating a frame, and in particular, to a method for generating a frame in an Orthogonal Frequency Division Multiple Access (OFDMA) communication system.

2. Description of the Related Art

Next-generation mobile communications need high-speed and high-quality data transmission to support various multimedia services of greater quality. Research is being conducted on OFDMA scheme as the scheme for satisfying this need.

Orthogonal Frequency Division Multiplexing (OFDM) scheme corresponding to a basis of the OFDMA is being widely used as a physical layer transmission scheme for various wireless communication systems such as a wireless Local Area Network (LAN), a digital Television (TV), a next-generation mobile communication system, and so on, because there are advantages in that the OFDM enables high-speed communication at low equalization complexity in a frequency selective fading channel.

As one of broadband wireless communication standards developed by the Institute for Electrical and Electronics Engineers (IEEE) working group, the IEEE 802.16 standard was approved on December 2001, under condition that a fixed point-to-point broadband wireless system operates in a spectral band of 10~66 GHz. In the IEEE 802.16a standard as an amendment of the IEEE 802.16 approved on January 2003, an extension for non-line-of-sight in a spectral band of 2~11 GHz is specified such that transmission can be performed within a maximum distance of 50 Km at a rate of 70 Mbps.

In addition to the IEEE 802.16 standard, various schemes are being discussed to support a high data rate in an OFDMA scheme-based wireless communication system. These various technologies are mostly related to a mechanism for allocating a dynamic frequency of a subchannel or subcarrier and power resources. For the resource allocation, correct channel information is necessary and an indication of concrete allocation information is mandatory.

FIG. 1 illustrates a radio frame structure of an IEEE 802.16 communication system. A conventional radio frame includes downlink and uplink frames. The downlink frame starts from a preamble for a downlink transmission and synchronization, and is configured by a data field, a Downlink MAP (DL-MAP) message for providing resource allocation information on a user terminal-by-user terminal basis, control information of a Uplink MAP (UL-MAP) message, and so on.

A DL-MAP message contained in the downlink frame includes common information such as a management message type, PHY synchronization Field, Downlink Channel Descriptor (DCD) count, and base station Identifier (ID) and a Downlink MAP information element (DL-MAP_E) relative to each user terminal. The DL-MAP_IE includes information about subchannels for each PHY burst of data, OFDM symbols, and Downlink Interval Usage Codes (DIUCs), and is used to define a downlink transmission.

A UL MAP message contained in the downlink frame includes common information such as a management message type, uplink channel ID, Uplink Channel Descriptor (UCD) count, allocation start time, and so on, as well as an Uplink MAP information element (UL-MAP_IE) relative to each user terminal. The UL-MAP_IE includes a Connection Identifier (CID) and an Uplink Interval Usage Code (UIUC), and it is used to define an uplink transmission.

As described above, the DL-MAP message and the UL-MAP message configuring the conventional radio frame include not only various IDs for user terminal identification and connection identification for a data transmission, but also necessary information of each of user terminal or burst. However, the DL-MAP message and the UL-MAP message are broadcasting message, so user terminal-by-user terminal or burst-by-burst information is broadcast through DL and UL-MAP messages, a waste of resources can occur.

Furthermore, because the number of DL-MAP_IEs increases proportionally to the number of bursts configuring data and the number of UL-MAP_IEs increases proportionally to the number of user terminals, user terminal-by-user terminal or burst-by-burst information is broadcast to all user terminals. For this reason, there is a problem in that there is a waste of resources.

SUMMARY OF THE INVENTION

It is, therefore, an object of the present invention to provide a method for generating a frame in an OFDMA communication system.

According to an aspect of the present invention, there is provided a method for generating a frame in an OFDMA communication system. The method includes generating a frame comprising a global information zone and a local information zone, wherein the global information zone includes information that is necessary to be received commonly in all of user terminals, and the local information zorie includes user terminal-by-user terminal or service-by-service traffic unnecessary to be received commonly in all of the user terminals.

BRIEF DESCRIPTION OF THE DRAWINGS

The above and other objects and aspects of the present invention will be more clearly understood from the following detailed description taken in conjunction with the accompanying drawings, in which:

FIG. 2 illustrates a method for classifying information to be included in a Downlink (DL) MAP message to reconfigure a radio frame format in an Orthogonal Frequency Division Multiple Access (OFDMA) communication system in accordance with the present invention;

FIG. 3 illustrates a Downlink MAP Information Element (DL-MAP_IE) format for configuring the DL-MAP message of FIG. 2;

FIG. 4 illustrates a method for classifying information to be included in an Uplink (UL) MAP message to reconfigure a radio frame format in the OFDMA communication system in accordance with the present invention;

FIG. 5 illustrates a UL-MAP_IE format for configuring the UL-MAP message of FIG. 4;

DETAILED DESCRIPTION OF THE PREFERRED EMBODIMENTS

Figure 1:
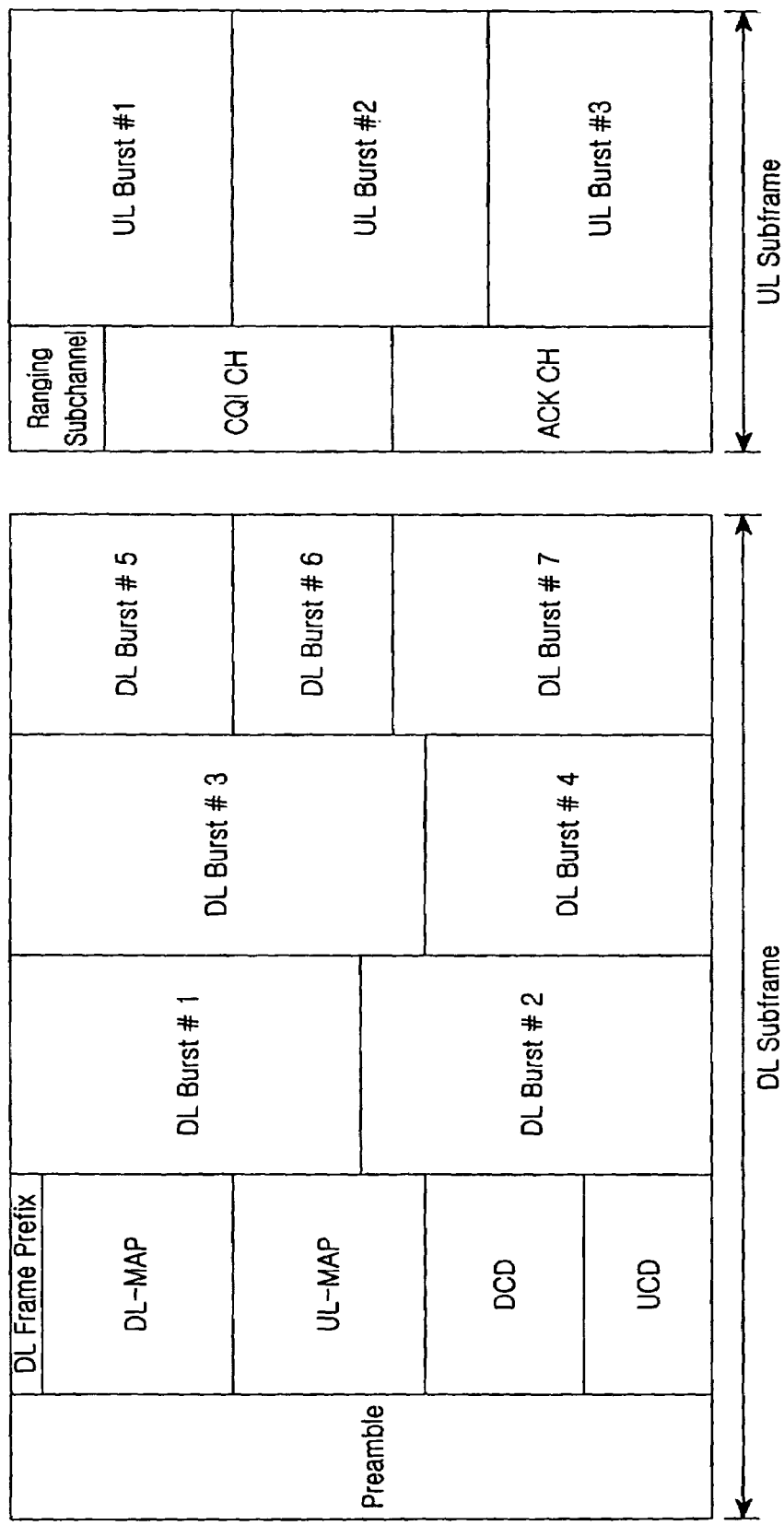
FIG. 1 illustrates a radio frame structure of an Institute for Electrical and Electronics Engineers (IEEE) 802.16 communication system.

Preferred embodiments of the present invention will now be described in detail with reference to the annexed drawings. In the following description, a detailed description of known functions and configurations incorporated herein has been omitted for the sake of clarity and conciseness.

The present invention discloses a method for generating a frame in an Orthogonal Frequency Division Multiple Access (OFDMA) communication system. The method for generating a frame according to a frame structure will be described as follows. Hereinafter, for convenience of explanation, both of "user" and "user terminal" will have the same meaning.

FIG. 2 illustrates a method for classifying information to be included in a Downlink (DL) MAP message to reconfigure a radio frame format in the OFDMA communication system in accordance with the present invention.

Among parameters for configuring the DL-MAP message of FIG. 2, a management message type, PHY synchronization information, Downlink Channel Descriptor (DCD) count, and base station Identifier (ID) can be classified into global control information 210 as information to be commonly transmitted to all terminals. A DL-MAP Information Element (IE) can be classified into local control information 220, which includes resource allocation information for each terminal.

FIG. 3 illustrates a DL-MAP_IE format for configuring the DL-MAP message of FIG. 2. The DL-MAP_IE includes INC_CID for indicating the presence of a Connection ID (CID), N_CID for indicating the number of CIDs, an OFDMA symbol offset, a subchannel offset, the number of OFDMA symbols, and the number of subchannels.

FIG. 4 illustrates a method for classifying information to be included in an Uplink (UL) MAP message to reconfigure a radio frame format in the OFDMA communication system in accordance with the present invention.

Among parameters configuring the UL-MAP message of FIG. 4 similar to the DL-MAP message, a management message type, uplink channel ID, Uplink Channel Descriptor (UCD) count, and allocation start time can be classified into global control information 210 as information to be commonly transmitted to all terminals. A UL-MAP Information Element (IE) can be classified into local control information 220, which includes resource allocation information for each terminal.

FIG. 5 illustrates a UL-MAP_IE format for configuring the UL MAP message of FIG. 4. Among parameters configuring the UL-MAP_IE, a CID, Uplink Interval Usage Code (UIUC), slot duration, repetition coding indication, and so on can be classified into the local control information 220 to be provided on a terminal-by-terminal basis. Parameters of an OFDMA symbol offset, a subchannel offset, the number of OFDMA symbols, the number of subchannels, a ranging method, a reserved field, a Code Division Multiple Access (CDMA) allocation IE (CDMA_Allocation_IE( )), an extended UIUC dependent IE, and so on can be classified into the global control information 210 as information capable of being commonly applied to all terminals.

When the radio frame is configured in accordance with the present invention, the global control information and the local control information classified as described above are transmitted through two or three predefined control information zones. For convenience of explanation, the control information zones are divided into Zone A, Zone B, and Zone C according to characteristics of the control information to be transmitted.

Zone A has a fixed time interval and contains a broadcast control channel to be transmitted. Zone A is based on a transmission in a super frame unit, and is distinguished by an indication bit. Information transmitted in Zone A is the global control information, and is transmitted in the form of a message field.

The use of Zone B is determined by an optional control channel design. Zone B is used when part of the local control information is transmitted in the form of the global control information. For example, when a channel capable of being shared between user terminals such as a blind decoding indicator channel or a paging channel is transmitted, Zone B can be used. Zone B can have a fixed or variable time interval, its relative information is obtained from Zone A. Moreover, Zone B is based on a transmission in a frame unit, and its control information is transmitted in the form of a message field.

Zone C has a channel according to a Predefined MAP for Resource Allocation (PMRA), and its relative information is obtained from Zone A or B. In Zone C, a data packet, a control packet, and a control channel can be transmitted. The data packet and the control packet can be overlaid. In this case, a receiving terminal needs to be able to distinguish the data packet and the control packet. A transmission unit is determined by the PMRA when transmitted content can include a data packet such as dedicated traffic (multicast/broadcast) and in-band signaling, a control packet such as a paging channel, and a control channel.

The PMRA is configured by segments defined by regularly (or irregularly) segmenting available resources in a uniform interval on frequency and time domains. A subchannel for one segment (or chunk) is configured by a diversity or Adaptive Modulation and Coding (AMC) channel. A traffic packet or control packet is transmitted in one segment. The segment can be configured by a traffic packet according to three types of traffic and an in-band signal as well as a control channel (Type Cb), or can be configured by a control packet (Type Ca) and a control channel (Type Cb).

For example, part of Band 1 to Band n is configured as an AMC subchannel band, and other bands can be configured by diversity subchannels. As a unit on a time axis, "duration" is a minimum transmission unit. Duration 1, Duration 2, Duration 3, and so forth can be grouped in a single transmission channel, and is a unit for a control channel transmission for blind decoding.

In the present invention, a group of segments allocated on a user terminal-by-user terminal basis or user terminal group-by-user terminal group basis is referred to as a chunk. Accordingly, the segment is a minimum unit for resource allocation.

Figure 6:
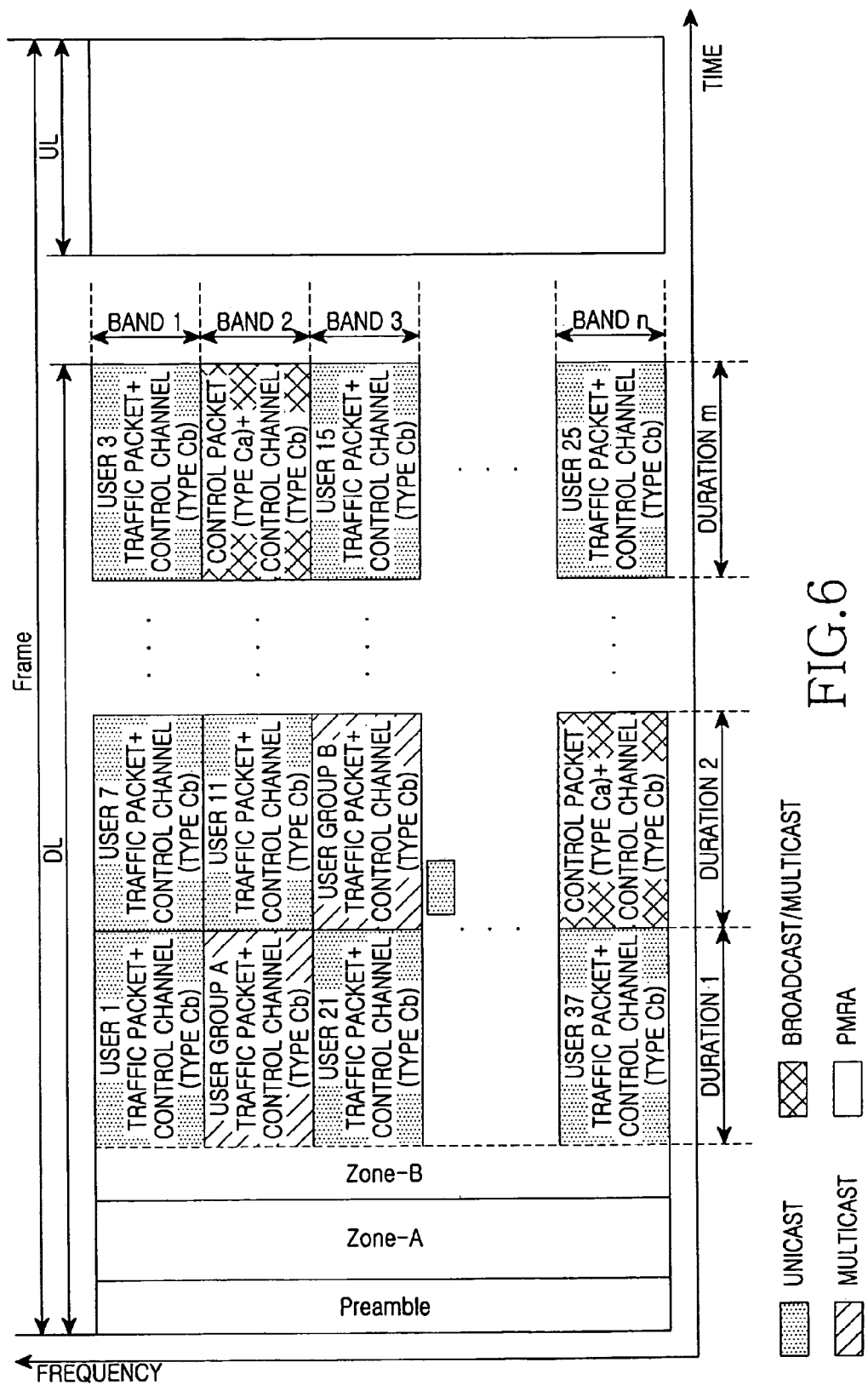
FIG. 6 illustrates a downlink frame structure of the OFDMA communication system in accordance with the present invention.

FIG. 6 illustrates a downlink frame structure of the OFDMA communication system in accordance with the present invention. A downlink frame configuring an OFDMA frame of the present invention is configured by including a preamble, Zone A of a fixed length including global control information such as a message type, PHY synchronization information, base station ID and so on, Zone B including common information such as the number of CIDs and a CID list and a PMRA for an actual traffic transmission, as well as Zone C.

The preamble and Zone A have a fixed length in the time domain, respectively. Zone B can be set in a fixed or variable length when a channel is designed.

As illustrated in FIG. 6, m×n segments are allocated to user terminals according to segment indices included in Zone B when the PMRA is configured by m time durations and n frequency bands.

In FIG. 6, a segment (1, 1) is allocated for a data packet and a control channel to be transmitted to User 1. A segment (1, 2) is allocated for a data packet and a control channel to be transmitted Multicast User Group A. A segment (1, 3) is allocated for a data packet and a control channel to be transmitted to User 21. A segment (1, n) is allocated for a data packet and a control channel to be transmitted to User 37. A segment (2, 1) is allocated for a data packet and a control channel to be transmitted to User 7. A segment (2, 2) is allocated for a data packet and a control channel to be transmitted to User 11. A segment (m, 1) is allocated for a data packet and a control channel to be transmitted to User 3. A segment (m, 3) is allocated for a data packet and a control channel to be transmitted to User 15. A segment (m, n) is allocated for a data packet and a control channel to be transmitted to User 25. Also, it can be seen that a segment (2, n) and a segment (m, 2) are allocated for a data packet and a control channel. This resource allocation information is broadcast through Zone B in the form of a segment index. Users refer to a mapping table of Zone B, detect segments allocated thereto, and receive traffic. In FIG. 6, one segment is allocated per user or user group. Alternatively, one or more segments may be allocated to one user or user group.

On the other hand, the present invention can reduce overhead due to a CID by using a short CID when the number of active users is less than the number of users in idle mode. Hierarchical ID characteristics used in the present invention are shown in Table 1.

TABLE 1

| | Basic CID | Active CID | Transport CID |
| --- | --- | --- | --- |
| Size | 16 bits | 8 bits | 16 bits |
| Allocation time | Time of Initial ranging | Time of generating first session except VoIP session | Time of generating first session in each class |
| Number of CIDs allocated on user-by-user basis | 1 | 1 | Same as the number of service classes |
| Collection time | Idle mode, power off | Time of ending all sessions | Time of ending all sessions within class |
| Uniqueness | Within cell | Within cell | Within cell |
| Transmission position | Zone C | Zone B or C | MAC PDU |
| Max number of users | 65536 | 256 | 65536 |

In accordance with the present invention, the OFDMA communication system supports Voice over Internet Protocol (VoIP) independent of other traffic. In other words, the VoIP is defined in a predefined chunk MAP. A 6-bit VoIP chunk index is indicated in Zone A or B.

In the OFDMA communication system of the present invention, resource allocation information schematically indicates a position in Zone A, and is shown in the form of a MAP in Zone B using a 8-bit active CID and a 6-bit chunk index. When a MAP is not used, a full blind detection scheme is used.

Figure 7:
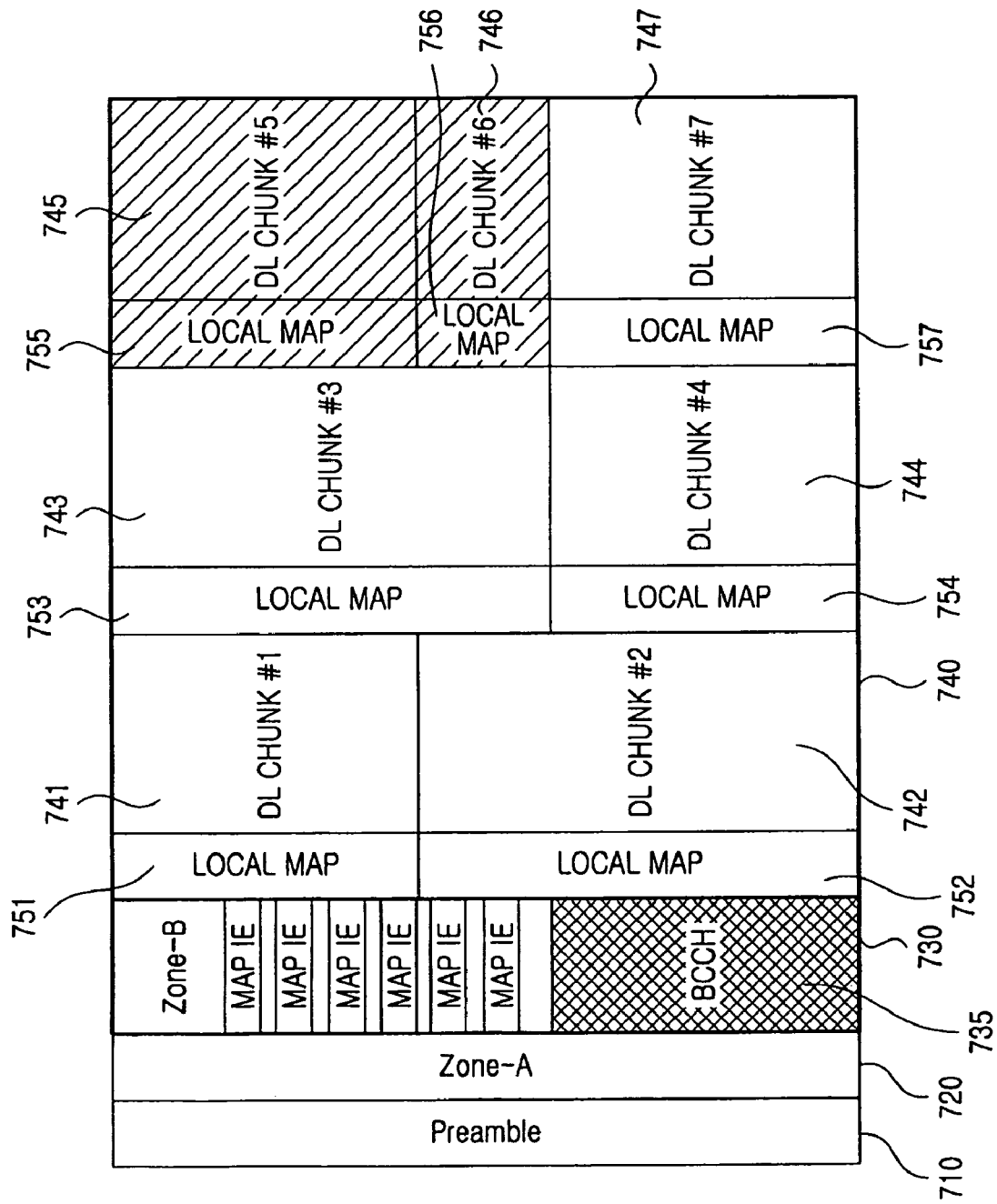
FIG. 7 illustrates a downlink frame structure of the OFDMA communication system in accordance with a first exemplary embodiment of the present invention.

FIG. 7 illustrates a downlink frame structure of the OFDMA communication system in accordance with a first exemplary embodiment of the present invention.

In accordance with the present invention, an OFDMA frame includes a preamble 710, Zone-A 720 including global control information such as a message type, PHY synchronization information, and base station ID, Zone-B 730 including MAP IEs including the number of CIDs, a CID list, an OFDM symbol offset, a subchannel offset, the number of OFDMA symbols, the number of subchannels, and a Broadcast Control Channel (BCCH) for broadcasting control information necessary to access a base station from a user, and Zone-C 740 for a downlink traffic transmission.

Zone-A 720 includes system information such as a message type, uplink channel ID, UCD count, allocation start time, etc. Zone-B 730 includes MAP IEs for providing resource allocation information on a user-by-user basis and a BCCH 735. Zone-C 740 includes traffic chunks 741~747 to be actually transmitted and local MAPs 751~757 including information such as a type of traffic to be transmitted through associated traffic chunks, a AMC scheme, etc. Herein, the chunk is a resource configured by at least one segment.

When receiving the preamble 710 and Zone A, a receiver refers to Zone A, and identifies system information such as a frame size and so on. Moreover, the receiver refers to its MAP_IE among MAP_IEs arrayed in Zone B and identifies a position of its own transmitted traffic chunk in Zone C. When the position of the traffic chunk is identified, the receiver refers to a local MAP transmitted before an associated traffic chunk and then processes traffic. The traffic chunks may be data traffic chunks 741, 742, 743, 744 and 747 and voice traffic chunks 745 and 746. A type of traffic chunk can be detected through control information included in Zone B.

Figure 8:
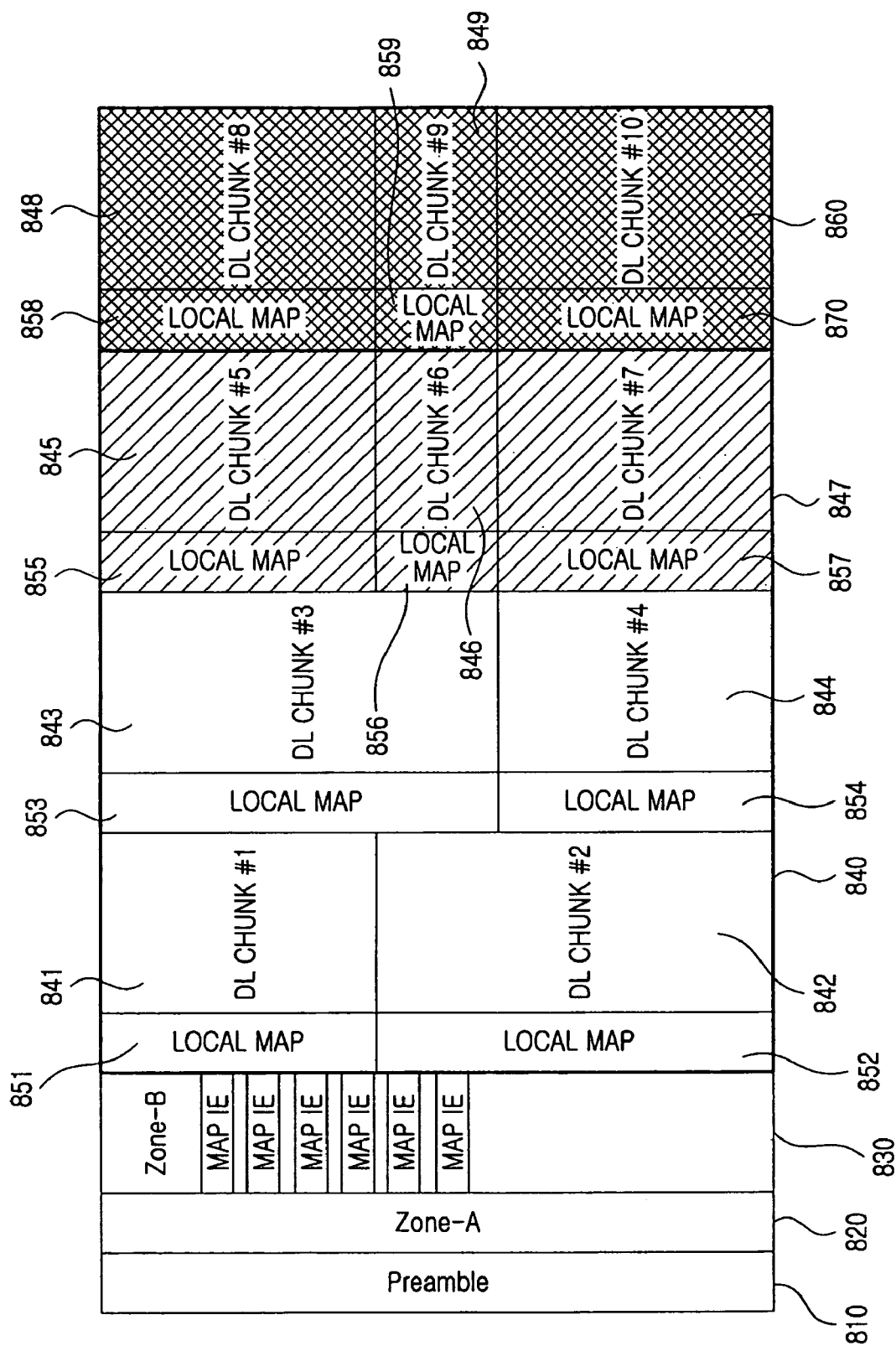
FIG. 8 illustrates a downlink frame structure of the OFDMA communication system in accordance with a second exemplary embodiment of the present invention.

FIG. 8 illustrates a downlink frame structure of the OFDMA communication system in accordance with a second exemplary embodiment of the present invention. In accordance with the second exemplary embodiment of the present invention, a downlink frame includes a preamble 810, Zone-A 820, Zone-B 830, and Zone-C 840.

The second exemplary embodiment is different from the first exemplary embodiment in that a BCCH is placed in Zone-C 840 rather than Zone B. In FIG. 8, some traffic chunks 841 to 844 serving as data traffic chunks for transmitting user data include preceding local MAPs 851 to 854. On the other hand, some traffic chunks 848, 849, and 860 are allocated for the BCCH. The BCCH chunks 848, 849, and 860 are transmitted along with preceding local MAPs 858, 859, and 870. In this case, the BCCH is processed according to a modulation and coding scheme (AMC) included in the preceding local MAP.

The receiver identifies a base station by referring to control information included in Zone A, and identifies the presence and position of its own transmitted traffic chunk and the position of a BCCH chunk by referring to a MAP IE of Zone B. The receiver receives the traffic and BCCH chunks when its own transmitted traffic chunk is present in the frame, and processes the traffic and BCCH by referring to a local MAP included before each traffic chunk.

Figure 9:
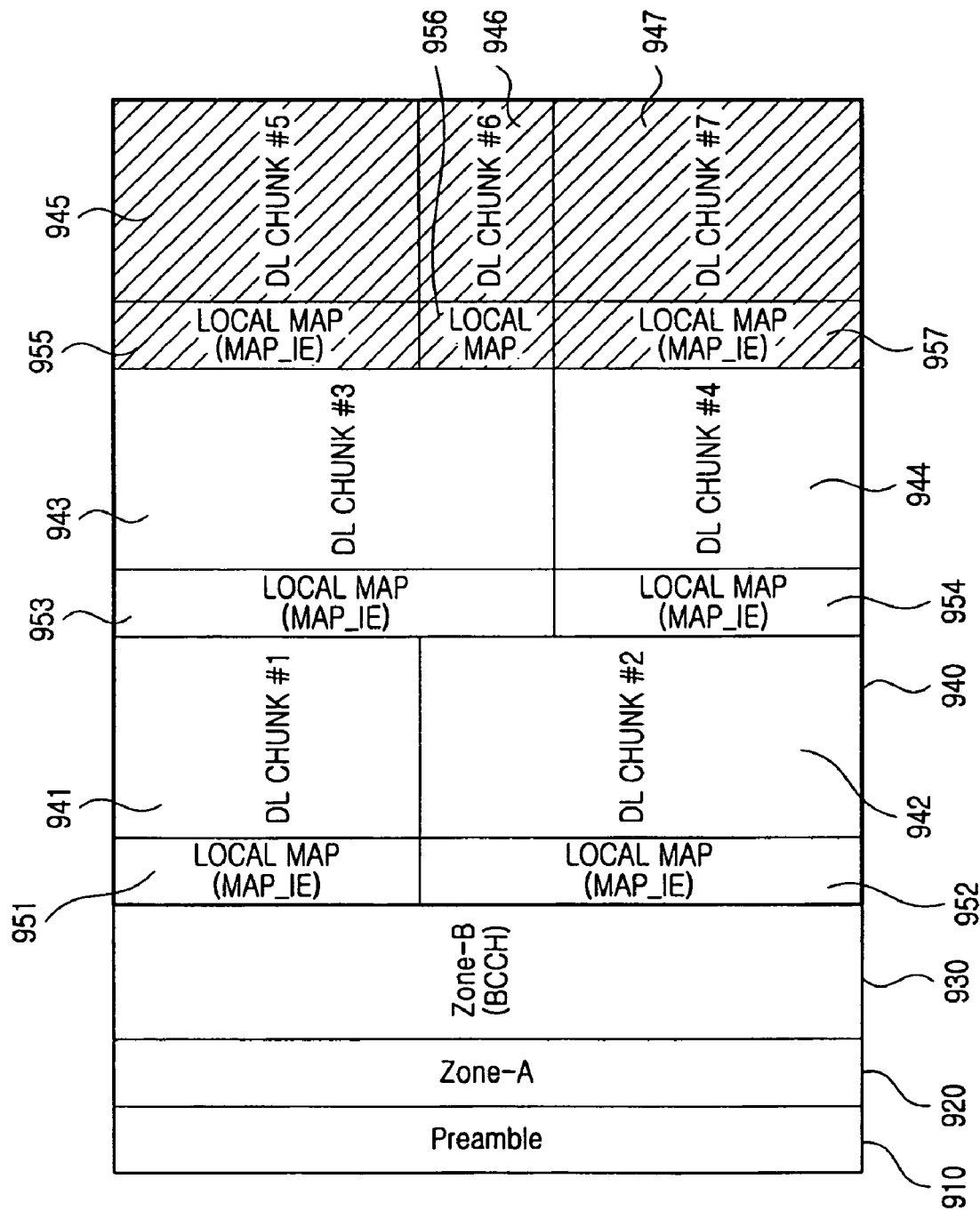
FIG. 9 illustrates a downlink frame structure of the OFDMA communication system in accordance with a third exemplary embodiment of the present invention.

FIG. 9 illustrates a downlink frame structure of the OFDMA communication system in accordance with a third exemplary embodiment of the present invention.

In accordance with the third exemplary embodiment of the present invention, a downlink frame comprises a preamble 910, Zone-A 920, Zone-B 930, and Zone-C 940.

In accordance with the third exemplary embodiment, a BCCH is included in Zone B 930, and a MAP IE is included in local MAPs 951 to 957 of Zone-C 940. Zone-C 940 includes data traffic chunks 941 to 944, local MAPs 951 to 954 before the data traffic chunks, voice traffic chunks 945 to 947, and local MAPs 955 to 957 before the voice traffic chunks. Each local MAP includes a MAP IE of an associated traffic chunk.

The receiver identifies a base station by referring to global control information included in Zone-A 920, and obtains information necessary to access the base station by referring to a BCCH of Zone-B 930. In the third exemplary embodiment, a MAP IE of each user is transmitted through Zone-C 940 rather than Zone-B 930. Accordingly, the receiver receives its own transmitted local MAP in a blind detection scheme, identifies a MAP IE, refers to AMC information included in a local MAP, and demodulates and decodes traffic chunk data.

Figure 10:
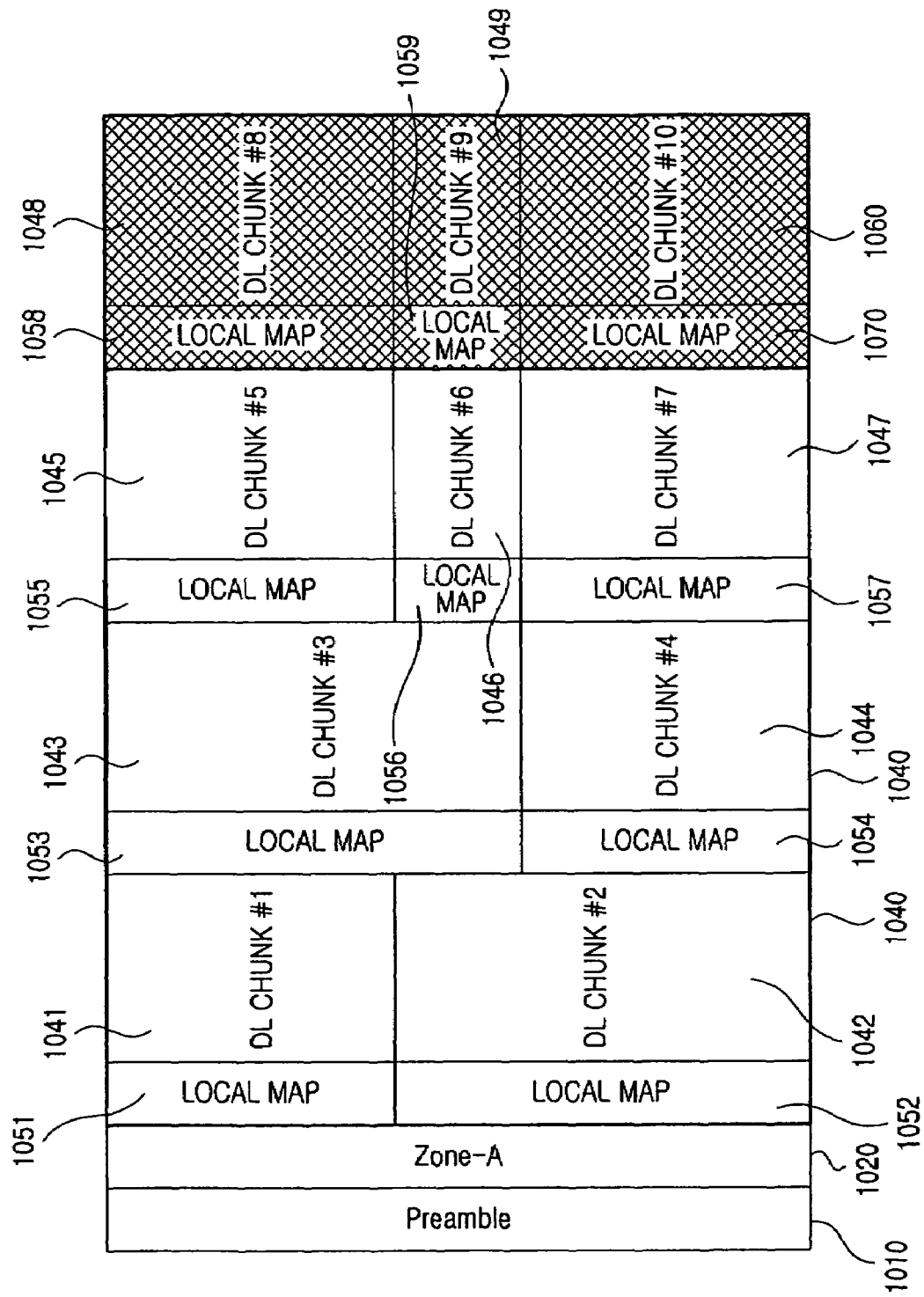
FIG. 10 illustrates a downlink frame structure of the OFDMA communication system in accordance with a fourth exemplary embodiment of the present invention.

FIG. 10 illustrates a downlink frame structure of the OFDMA communication system in accordance with a fourth exemplary embodiment of the present invention. In accordance with the fourth exemplary embodiment, a downlink frame comprises a preamble 1010, Zone-A 1020, and Zone-C 1040.

In the fourth exemplary embodiment, a MAP IE is included in local MAPs 1051 to 1057 of traffic chunks 1041 to 1047 configuring Zone-C 1040 and a BCCH is transmitted along with local MAPs 1058, 1059, and 1070 mapped to BCCH traffic chunks 1048, 1049, and 1060. Accordingly, the receiver receives its own transmitted data chunk through a blind detection scheme and a BCCH chunk serving as a broadcast signal after identifying a base station by referring to Zone A. Moreover, the receiver refers to local MAP information before each chunk and then processes the data and BCCH chunks.

Figure 11:
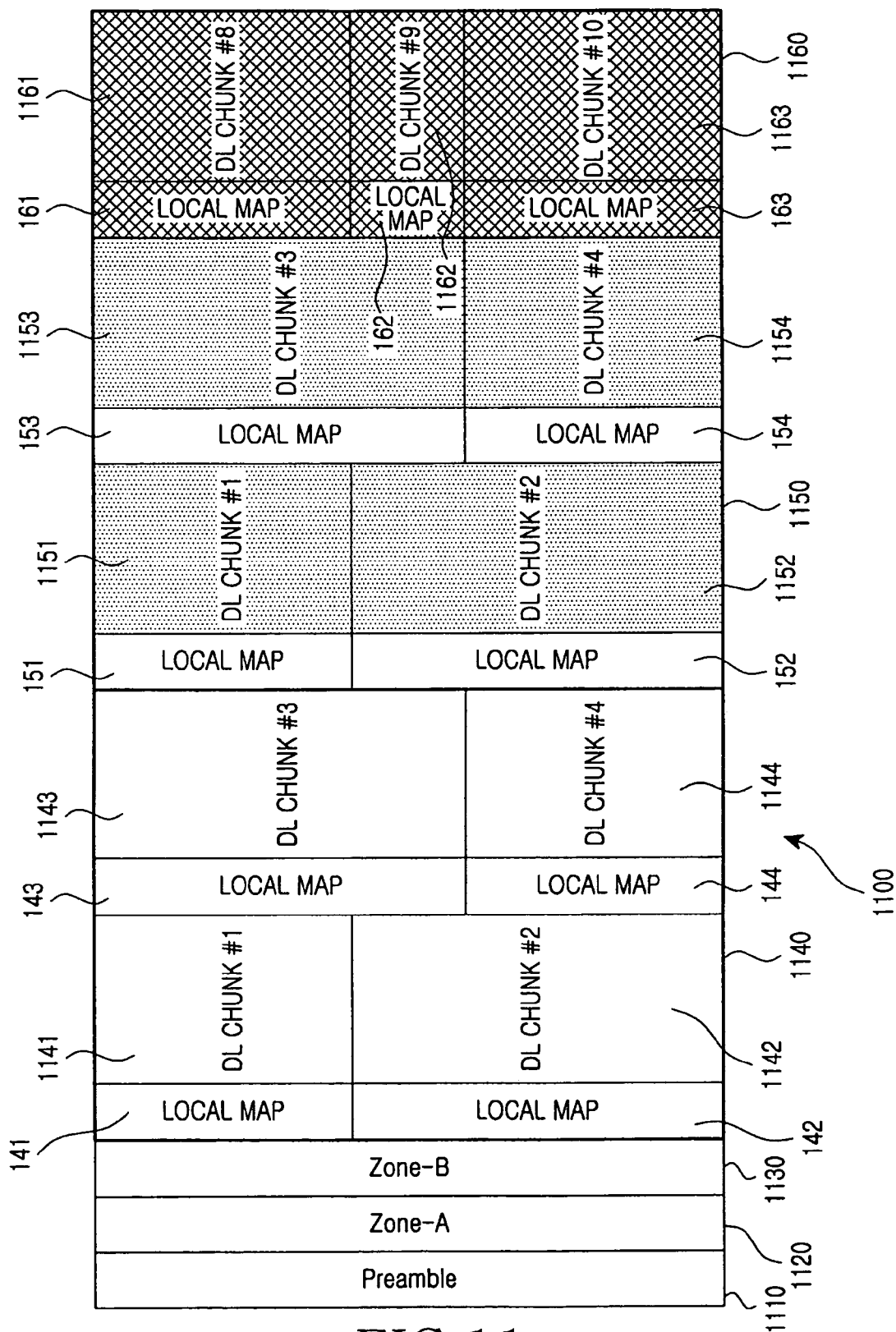
FIG. 11 illustrates a downlink frame structure of the OFDMA communication system in accordance with a fifth exemplary embodiment of the present invention.

FIG. 11 illustrates a downlink frame structure of the OFDMA communication system in accordance with a fifth exemplary embodiment of the present invention. In accordance with the fifth exemplary embodiment of the present invention, a downlink frame includes a preamble 1110, Zone-A 1120, Zone-B 1130, and Zone-C 1100.

Zone-C 1100 includes blind detection zones 1140 and 1150 and a BCCH zone 1160. Position information about the blind detection zones 1140 and 1150 and the BCCH zone 1160 in Zone C is broadcast through Zone B.

As illustrated in FIG. 11, the first blind detection zone 1140 is configured by downlink chunks 1141 to 1144 and Link Adaptation (LA) information elements 141 to 144 for the downlink chunks. The second blind detection zone 1150 is configured by downlink chunks 1151 to 1154 and LA information elements 151 to 154 for the downlink chunks. On the other hand, the BCCH zone 1160 includes downlink chunks 1161, 1162, and 1163, as well as LA information elements 161, 162, and 163 for downlink chunks. It is preferred that the blind detection zones are configured according to a service class or user ID.

In this case, the receiver refers to service class-by-service class or user-by-user information about the blind detection zones, and detects its own transmitted downlink chunk from the blind detection zone mapped to its own service class or user ID. Moreover, the receiver refers to position information about the BCCH zone 1160 included in Zone-B 1130, and receives the BCCH downlink chunks 1161, 1162, and 1163. Each receiver process a downlink chunk on the basis of LA information of a local MAP before each downlink chunk when receiving its own transmitted downlink chunk.

Figure 12:
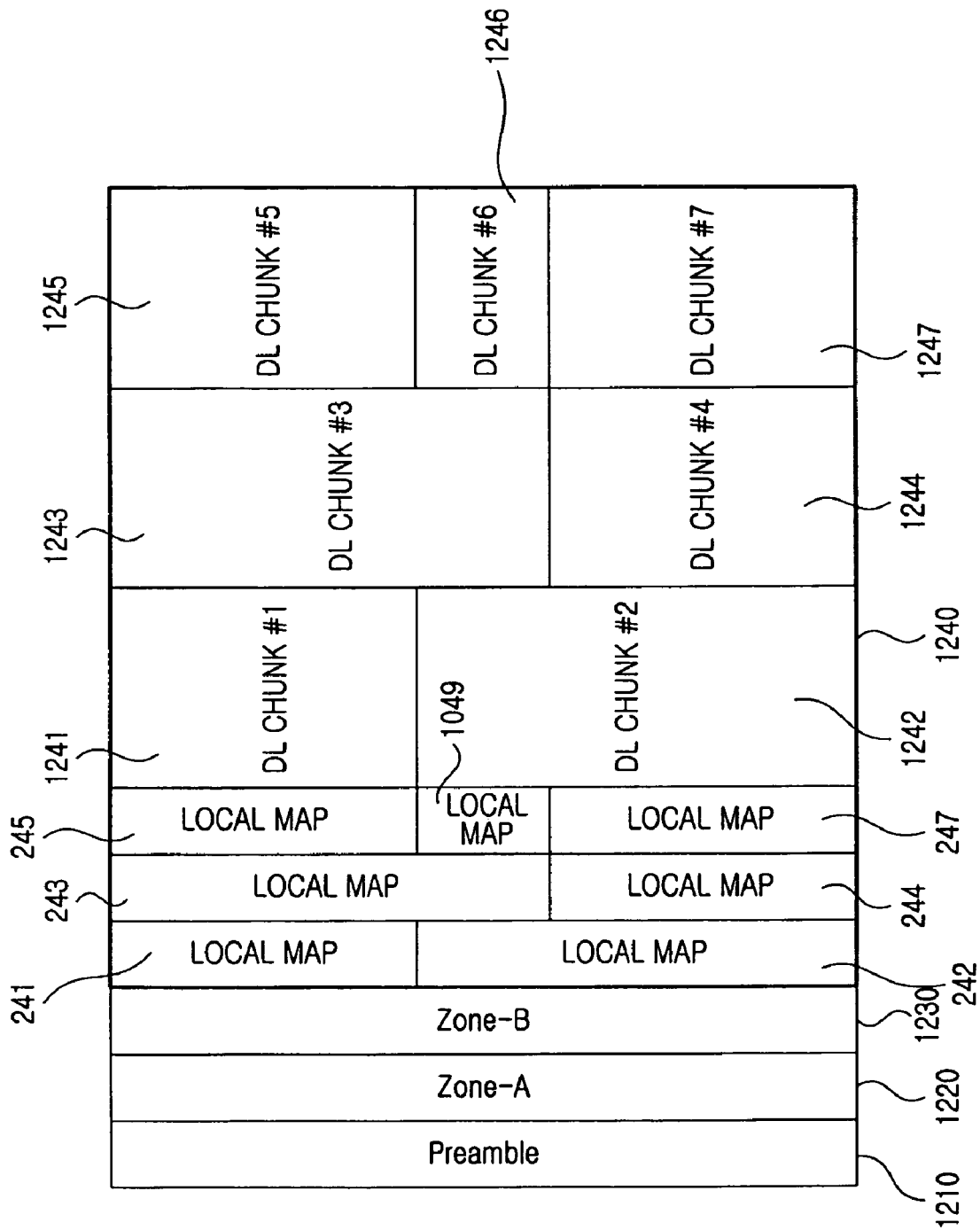
FIG. 12 illustrates a downlink frame structure of the OFDMA communication system in accordance with a sixth exemplary embodiment of the present invention.

FIG. 12 illustrates a downlink frame structure of the OFDMA communication system in accordance with a sixth exemplary embodiment of the present invention. In accordance with the sixth exemplary embodiment of the present invention, a downlink frame comprises a preamble 1210, Zone-A 1220, Zone-B 1230, and Zone-C 1240.

Zone-C 1240 includes downlink chunks 1241 to 1247. In the above-described embodiment, local MAPs 241 to 247 before downlink chunks are arranged in the head part of Zone C in the same order as the downlink chunks are arranged.

Accordingly, the receiver identifies positions of its own transmitted local MAP and downlink chunk by referring to control information of Zone B, and processes an associated downlink chunk by referring to LA information included in the local MAP.

In the above-described OFDMA frame structure of the present invention, control information to be broadcast to users is transmitted and is classified into global control information to be shared between all the users or active users as well as local control information specified for each user. Overhead due to a repetition transmission of the local control information can be reduced.

In the OFDMA frame structure of the present invention, resource MAPs based on the number of users and service types are generated in a segment unit defined by a uniform frequency band and uniform time duration. Resource allocation information is transmitted to the users in the form of a resource MAP index, such that downlink traffic overload can be reduced.

Although the exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for generating a frame in an Orthogonal Frequency Division Multiple Access (OFDMA) communication system, comprising:

generating a frame including a first zone, second zone, and a third zone, wherein the first zone includes global control information being commonly applied to all user terminals, wherein the second zone includes a part of local control information, when the part of the local control information based on a user terminal-by-user terminal is transmitted as the global control information, and wherein the third zone includes a channel according to a MAP for resource allocation, when the part of the local control information based on a user terminal-by-user terminal is transmitted as the global control information.

2. The method of claim 1, wherein the global control information includes a management type, physical (PHY) synchronization information, channel information, and a base station Identifier (ID).

3. The method of claim 1, wherein the second zone includes MAP Information Elements (IEs) for providing resource allocation information on a user terminal-by-user terminal basis and a Broadcast Control Channel (BCCH) for broadcasting control information necessary to access a base station from a user terminal, and wherein each of the MAP IEs includes a number of Connection Identifiers (CIDs), a CID list, an Orthogonal Frequency Division Multiplexing (OFDM) symbol offset, a subchannel offset, a number of OFDMA symbols, and a number of subchannels.

4. The method of claim 1, wherein the third zone is configured by traffic chunks allocated on a user terminal-by-user terminal basis or service-by-service basis according to the global control information, and includes local MAPs including a type of traffic to be transmitted through associated traffic chunks, and an Adaptive Modulation and Coding (AMC) scheme, and wherein each of the traffic chunks is a resource configured by at least one segment which is defined by segmenting available resources in a uniform interval on frequency and time domains.

5. The method of claim 1, wherein the third zone includes at least one Broadcast Control Channel (BCCH) traffic chunk for broadcasting control information necessary to access a base station from a user terminal.

6. The method of claim 1, wherein the second zone includes a Broadcast Control Channel BCCH for broadcasting control information necessary to access a base station from a user terminal, and wherein each of MAP Information Elements (IEs) is included in each of local MAPs of traffic chunks configuring the third zone, each of the local MAPs is transmitted in the third zone, and each of the traffic chunks is a resource configured by at least one segment which is defined by segmenting available resources in a uniform interval on frequency and time domains.

7. The method of claim 6, wherein a user terminal receives a local MAP in a blind detection scheme, identifies a MAP IE, refers to AMC information included in the local MAP, and demodulates and decodes traffic chunk data.

8. The method of claim 1, wherein each of MAP IEs is included in each of local MAPs of traffic chunks configuring the third zone, a Broadcast Control Channel (BCCH) for broadcasting control information necessary to access a base station from a user terminal is transmitted along with the local MAPs in the third zone, and each of the traffic chunks is a resource configured by at least one segment which is defined by segmenting available resources in a uniform interval on frequency and time domains.

9. The method of claim 8, wherein a user terminal receives data chunks through a blind detection scheme and BCCH chunks serving as a broadcast signal, after identifying a base station by the global control information transmitted in the first zone, and refers to local MAP information before each of the chunks and processes the data and BCCH chunks.

10. The method of claim 1, wherein the third zone includes at least one blind detection zone and a Broadcast Control Channel (BCCH) zone, the at least one blind detection zone is configured according to a service class or user terminal Identifier (ID), and wherein position information about the at least one blind detection zone and the BCCH zone is broadcast through the second zone, each of the traffic chunks is a resource configured by at least one segment which is defined by segmenting available resources in a uniform interval on frequency and time domains.

11. The method of claim 1, wherein the third zone includes downlink chunks, local MAPs before the downlink chunks are arranged in a head part of the third zone in a same order as the downlink chunks are arranged, and each of the downlink chunks is a resource configured by at least one segment which is defined by segmenting available resources in a uniform interval on frequency and time domains.

* * * * *

UNITED STATES PATENT AND TRADEMARK OFFICE
CERTIFICATE OF CORRECTION

PATENT NO. : 7,664,087 B2  Page 1 of 1
APPLICATION NO. : 11/522196
DATED : February 16, 2010
INVENTOR(S) : Cho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 623 days.

Signed and Sealed this

Thirtieth Day of November, 2010

David J. Kappos
*Director of the United States Patent and Trademark Office*